Sept. 19, 1967   W. H. KELM   3,341,923
CUTTING TOOL
Filed Sept. 9, 1966   2 Sheets-Sheet 1
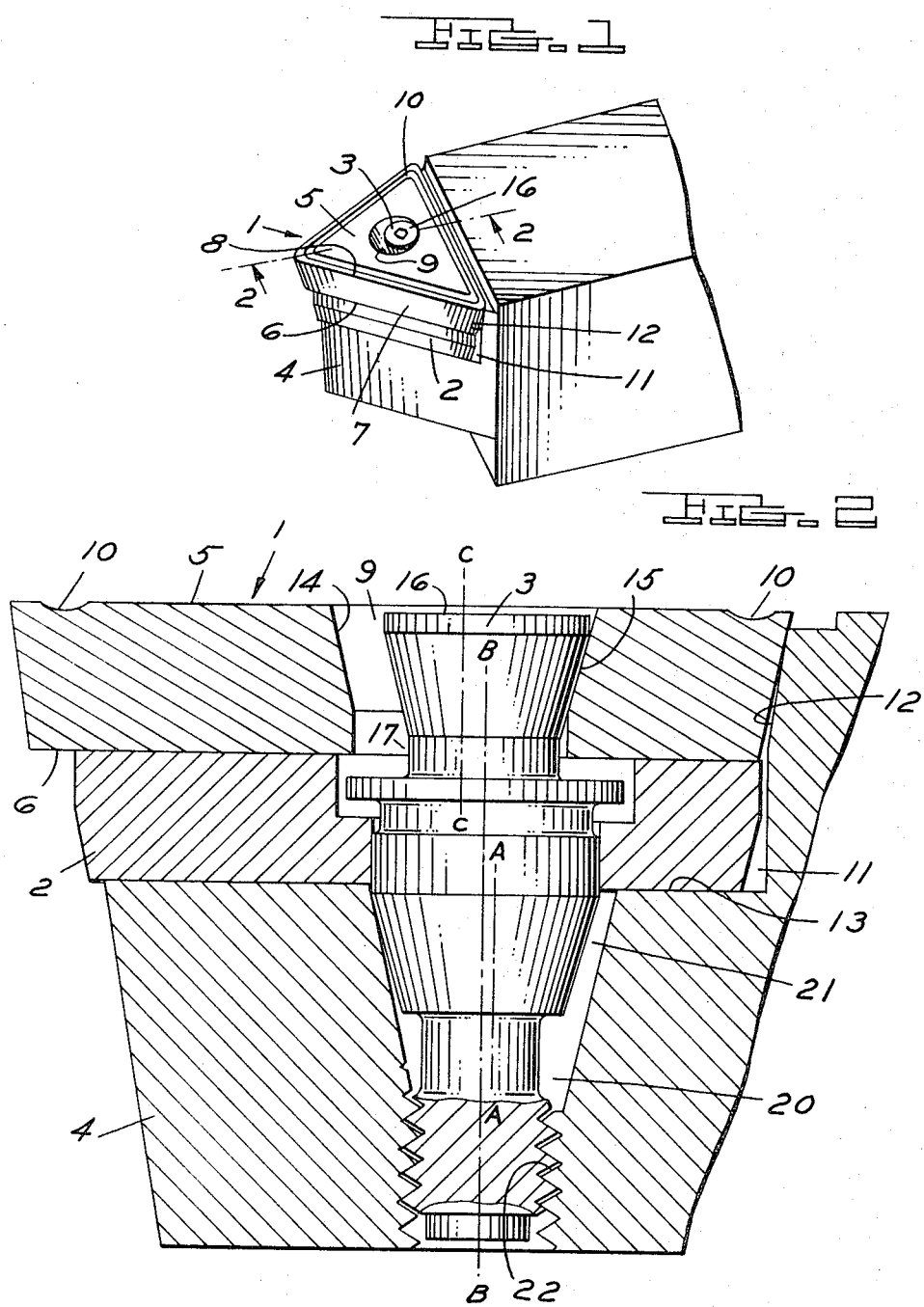
INVENTOR
WALTER H. KELM
BY Harold Holt
ATTORNEY Sept. 19, 1967
W. H. KELM
3,341,923
CUTTING TOOL
Filed Sept. 9, 1966
2 Sheets-Sheet 2
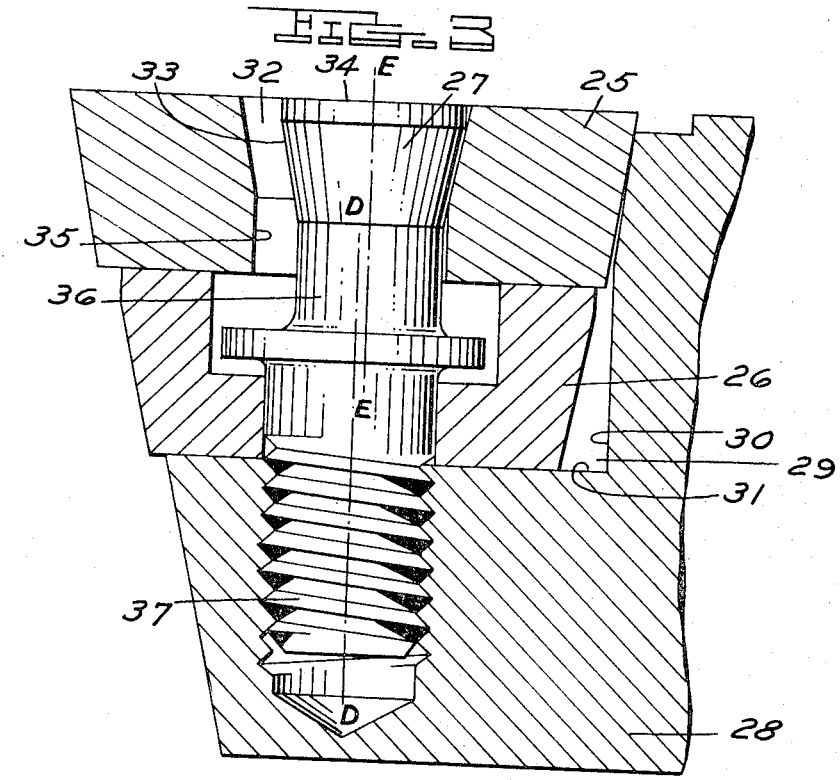
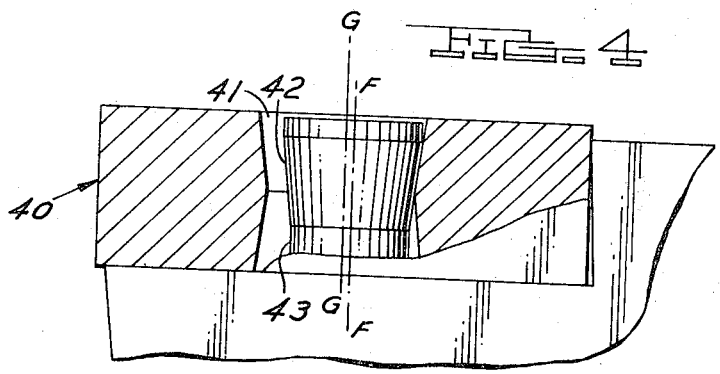
INVENTOR
WALTER H. KELM
BY *Harold J Holt*
ATTORNEY United States Patent Office 3,341,923
Patented Sept. 19, 1967

3,341,923
CUTTING TOOL
Walter H. Kelm, Mount Clemens, Mich., assignor to General Electric Company, a corporation of New York
Filed Sept. 9, 1966, Ser. No. 578,174
2 Claims. (Cl. 29—96)

ABSTRACT OF THE DISCLOSURE

A cutting tool of the positive-rake type in which the insert is held against a tapered shoulder of the cutting tool body by a retention pin. The retention pin has an enlarged tapered end which projects into a hole in the insert which has a taper complementary to that of the tapered end of a pin. The largest diameter of the projecting end of the pin is smaller than the smallest diameter of the hole in the insert. Locking of the insert occurs by movement of the pin and insert toward the shoulder of the cutting tool body.

---

This application is a continuation-in-part of my copending application S.N. 433,117 filed Feb. 16, 1965.

This invention is directed to a cutting tool of the type used in the machining of metal and more specifically to a cutting tool for positive-rake cutting in which a disposable insert of a hard cutting material is releasably held in a toolholder.

Cutting tools having pin-type holding means for retaining disposable inserts have become increasingly more popular since their introduction in the last few years. In such cutting tools, a pin projects into a central hole in the insert and holds the insert against a shoulder of the shank of the toolholder. Pin-type tools possess a number of advantages over the older clamp-type toolholders in which an overhead- or bridge-type clamp holds a cutting insert in place. There are fewer operating parts in the pin-type holder, they present an unobstructed silhouette to the workpiece, and they permit quicker and easier indexing and replacement of inserts.

Such pin-type holding means, however, present a problem with respect to disposable inserts used in positive-rake cutting and, in some instances, with negative-rake inserts. Cutting inserts of the positive-rake type normally posess an angled peripheral surface or relief angle which creates a tendency for the insert to lift or to ride up the shoulder of the shank when subjected to the stresses of a machining operation or even when locking the insert in place.

A principal object of the present invention is to provide a cutting tool in which a cutting insert, and particularly a positive-rake cutting insert, is releasably but securely held in the shank of a cutting tool holder by a pin-type holding mechanism which permits indexing or removing of the cuttng insert to be accomplished simply and rapidly.

In general, the foregoing and other objects of the invention are achieved in a cutting tool in which an insert is held by the use of a pin which is tapered outwardly or flared at the top and which mates with a corresponding taper in the central hole of the insert, so that there is a downward force exerted against the insert when it is locked in position. The pin locks the insert in place by laterally moving the pin against a shoulder in the shank of the holder. The smallest diameter of the tapered hole in the insert is larger than the largest diameter of that portion of the pin which projects into the hole in the insert. As a result, the insert may be removed from the shank without removal of the pin holding means.

The invention will be more clearly understood from the following description taken in conjunction with the accompanying drawing in which FIGURE 1 is a perspective view of one embodiment of a cutting tool of the invention;

FIGURE 2 is a cross-sectional view of the cutting tool head taken along the lines 2—2 of FIG. 1; and FIGURES 3 and 4 are cross-sectional views of a second and third embodiment of the cutting tool of the invention.

Referring to FIG. 1, the cutting tool comprises a cutting insert 1, a cutting insert seat 2, a retention pin 3, and a cutting tool body or shank 4. Cutting tool shank 4 contains a recess 11 at the head portion thereof to provide a supporting shoulder 12 and a base 13 for supporting insert 1 and seat 2. The cutting insert is of the disposable- or throwaway-type having opposite-spaced parallel faces 5 and 6 and peripheral surface 7. A plurality of cutting edges 8 are provided on the top face of the insert. The insert is of the positive-rake type in which peripheral surface 7 forms an acute angle (the relief angle) with the top parallel face 5 and an oblique angle with opposite parallel face 6. The axis of central hole 9 in the insert is perpendicular to each of the parallel faces. The top face 5 of the insert contains continuous chip-control groove 10.

As can be seen in FIG. 2, central hole 9 in the insert is flared or tapered outwardly at 14. The end of locking pin 3 which projects into the central hole in the insert is also flared at 15 to provide a complementary taper to the hole 9 in the insert. The angle of the taper 14 in the insert provides an effective angle in locking position greater than the relief angle of the insert to provide a vertical trap against lifting of the insert. The largest diameter of the top portion of pin 3, i.e., the end of the pin projecting into the hole in the insert, is along its top surface 16. This diameter is less than the smallest diameter of hole 9 which is at the bottom of the insert hole at 17. This permits removal of the insert without removing pin 3 from the shank.

Pin 3 holds the insert and seat in place as follows: Pin 3 is threaded into a hole 20 in the recess 11 of the shank 4. The upper portion 21 of the hole in the recess is tapered inwardly from the base of the recess to form a conical portion having a central axis identified by the line A—A. The remaining threaded portion 22 of the hole in the recess of the shank is cylindrical and has a central axis B—B offset from the axis A—A in a direction away from the supporting shoulder 12 of the recess in the shank. The centerline C—C of hole 9 in the insert is offset further from supporting shoulder 12 than either axis A—A or B—B so that the insert is pre-positioned closer to the pin for locking. The offset of the various axes from each other need only be a matter of a few thousands of an inch. The offset distances have been exaggerated in the drawings for purposes of illustration. As pin 3, which is symmetrical about a single axis, is threaded into the hole in the recess of the shank, a wedging or interfering contact with the conical portion of the hole in the shank will occur and as the pin moves axially into the holder, the insert will be tightened against the shoulder of the holder by lateral movement of the projecting portion of the pin. This type of locking mechanism is the subject of my aforesaid parent application S.N. 433,117 and is more fully disclosed therein.

A second embodiment of the invention wherein an eccentric pin is used to hold the insert is shown in FIG. 3. The cutting tool there shown comprises a cutting insert 25, a seat 26, a threaded retention pin 27 and a shank 28. The shank 28 contains a recess 29 at the head portion thereof to provide a supporting shoulder 30 and a base 31 for supporting insert 25 and seat 26. Insert 25 is identical to the insert shown in FIGS. 1 and 2 containing a tapered central hole 32. Pin 27 is also flared at 33 to provide a complementary taper to the taper of the insert.

The largest diameter of pin 27 along its top surface 34 is smaller than the smallest diameter of hole 32 along the bottom of the insert at 35, as is the case in the embodiment of FIGS. 1 and 2.

The centerline of projecting portion 36 of pin 27 is off center several thousandths of an inch from the centerline of the threaded base portion 37 of the pin so that the projection portion 36 is an eccentric. This is shown in FIG. 3 in which D—D identifies the centerline of the base of the pin and E—E identifies the centerline of the portion 36 of the pin which projects into the insert. As pin 27 is threaded into the shank, the eccentric projection forces the insert laterally against shoulder 30 of the holder and locks the insert in place.

Another embodiment of the invention is illustrated in FIG. 4 with a negative-rake insert. The insert 40 is both indexable and invertible, the top and peripheral surfaces of the insert meeting at right angles. The insert contains central hole 41 containing a double taper, each the mirror image of the other. Each taper is outward from the center of hole 41 toward the upper and lower parallel faces respectively. The taper adjacent the top surface of the insert will of course be the taper utilized in locking the insert in the holder. The centerline F—F of the projecting portion 42 of the pin 43 is offset toward the shoulder with respect to the centerline G—G of the insert hole. Thus tightening of pin 43 moves the insert laterally against the shoulder of the recess and locks it in place. The pin design used for locking the insert could be that of either FIG. 2 or FIG. 3.

One of the essential features of the invention is the use of a locking pin capable of lateral movement or adjustment toward the locking shoulder. Because the portion of the pin projecting into the insert hole is smaller than any diameter of the hole, no locking would occur in the absence of such lateral movement. Of course, the pin may be moving axially into the holder simultaneously with such lateral movement so that the resultant direction of the pin is at an angle to the horizontal, but some lateral displacement of the pin toward the shoulder is necessary. In locked position, the centerline or axis of the pin should always be closer to the shoulder than the centerline of the hole in the insert.

What I claim as new and desire to secure by Letters Patent of the United States is:

1. A cutting tool comprising
   a disposable cutting insert having upper and lower parallel faces, peripheral surfaces between said faces meeting with said upper face at an acute angle to form a plurality of cutting edges and a central axial hole between said parallel faces, said axial hole being tapered inwardly from said upper face, said insert being indexable to utilize each of said cutting edges,
   a cutting tool body having a recess therein to provide a base and a shoulder for support of a face and a portion of the peripheral surface of the insert, said shoulder being tapered complementary to the peripheral surface of the insert,
   a retention pin adjustably secured at one end thereof in the cutting tool body, the other end of said pin projecting into the hole in the insert, said projecting end being symmetrical about its central axis and being tapered so as to form a complementary taper with the hole in the insert, the largest diameter of the projecting end of said pin being less than the smallest diameter of the tapered hole in the insert, the projecting end of said pin being adjustable toward the shoulder of the recess in the cutting tool body,
   said retention pin adapted upon such adjustment to lock said insert in the recess of the cutting tool body.

2. The cutting tool of claim 1 in which the retention pin is in the form of an eccentric, with the projecting end being offset from the remainder of the pin.

References Cited

UNITED STATES PATENTS

| | | | |
|---|---|---|---|
| 2,598,581 | 5/1952 | McKenna | 29—98 |
| 3,097,417 | 7/1963 | Hill | 29—96 |
| 3,173,191 | 3/1965 | Alexander | 29—96 |
| 3,226,797 | 1/1966 | Hertel | 29—96 |

HARRISON L. HINSON, *Primary Examiner.*